US012615691B2

(12) United States Patent
Zhao et al.

(10) Patent No.: US 12,615,691 B2
(45) Date of Patent: Apr. 28, 2026

(54) WIFI NETWORK ACCESS METHOD, COMMUNICATION METHOD, PERIPHERAL APPARATUS, AND STORAGE MEDIUM

(71) Applicant: Zhuhai Pantum Electronics Co., Ltd., Zhuhai (CN)

(72) Inventors: Jing Zhao, Zhuhai (CN); Baoxu Jiang, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 608 days.

(21) Appl. No.: 17/974,270

(22) Filed: Oct. 26, 2022

(65) Prior Publication Data

US 2023/0126360 A1 Apr. 27, 2023

(30) Foreign Application Priority Data

Oct. 27, 2021 (CN) .......................... 202111257540.4
Apr. 27, 2022 (CN) .......................... 202210532260.8

(51) Int. Cl.
*H04W 76/40* (2018.01)
*H04W 76/14* (2018.01)

(52) U.S. Cl.
CPC ........... *H04W 76/40* (2018.02); *H04W 76/14* (2018.02)

(58) Field of Classification Search
CPC ..... H04W 48/16; H04W 48/08; H04W 48/10; H04W 48/80; H04W 12/50; H04W 12/04
See application file for complete search history.

(56) References Cited

U.S. PATENT DOCUMENTS

| 2017/0215030 | A1* | 7/2017 | Choi ........................ H04W 4/80 |
| 2023/0171191 | A1* | 6/2023 | Ignatchenko ........... H04L 69/16 |
| | | | 370/392 |

FOREIGN PATENT DOCUMENTS

| CN | 104539324 | A | 4/2015 |
| CN | 105873182 | A | 8/2016 |
| CN | 107087247 | A | 8/2017 |
| CN | 107231606 | A | 10/2017 |

(Continued)

OTHER PUBLICATIONS

Anonymous:"How to Share Your Wi-Fi Password From Your Phone", HighSpeedInternet.com, Oct. 15, 2021. 9 pages.

*Primary Examiner* — Mahran Y Abu Roumi
(74) *Attorney, Agent, or Firm* — Anova Law Group, PLLC

(57) ABSTRACT

A WiFi network access method is applied to a peripheral apparatus. The peripheral apparatus includes a first Bluetooth module and a WiFi module. The method includes, in response to the peripheral apparatus entering a network configuration state, entering a first broadcast state through the first Bluetooth module, sending a first type broadcast packet to a control terminal through the first Bluetooth module, establishing a Bluetooth connection between the peripheral apparatus and the control terminal, receiving router network configuration information from the control terminal through the first Bluetooth module, and connecting the WiFi module into a WiFi network according to the router network configuration information. The first type broadcast packet includes service UUID, identification information of the peripheral apparatus, and a device ID. The identification information of the peripheral apparatus allows a user to first select the peripheral apparatus in a display interface of the control terminal for network configuration.

11 Claims, 6 Drawing Sheets

(56) References Cited

FOREIGN PATENT DOCUMENTS

| CN | 107801229 | A | 3/2018 |
| CN | 108513283 | A | 9/2018 |
| CN | 110166974 | A | 8/2019 |
| CN | 113518407 | A | 10/2021 |

* cited by examiner

110

120

110

120

| Control terminal | Peripheral apparatus |
|---|---|
| Second Bluetooth module | First Bluetooth module |
|  | WiFi Module |

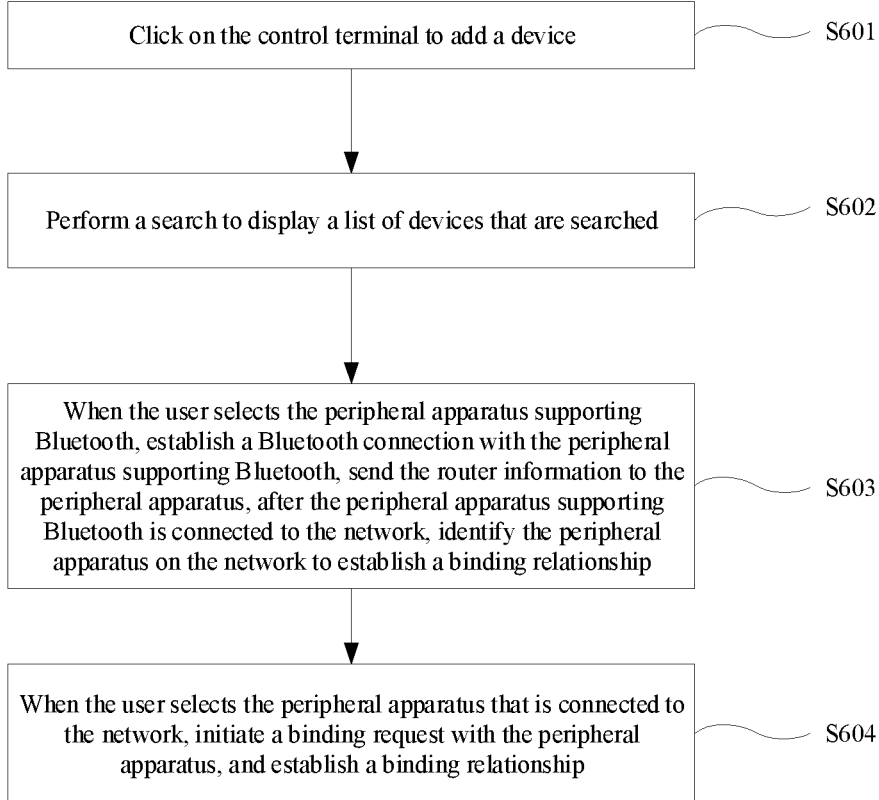

Click on the control terminal to add a device  —— S601

Perform a search to display a list of devices that are searched  —— S602

When the user selects the peripheral apparatus supporting Bluetooth, establish a Bluetooth connection with the peripheral apparatus supporting Bluetooth, send the router information to the peripheral apparatus, after the peripheral apparatus supporting Bluetooth is connected to the network, identify the peripheral apparatus on the network to establish a binding relationship  —— S603

When the user selects the peripheral apparatus that is connected to the network, initiate a binding request with the peripheral apparatus, and establish a binding relationship  —— S604

FIG. 6

WIFI NETWORK ACCESS METHOD, COMMUNICATION METHOD, PERIPHERAL APPARATUS, AND STORAGE MEDIUM

CROSS-REFERENCE TO RELATED APPLICATIONS

This application claims priority to Chinese Application No. 202210532260.8, filed Apr. 27, 2022, and Chinese Application No. 202111257540.4, filed Oct. 27, 2021, the entire contents of all of which are incorporated herein by reference.

TECHNICAL FIELD

The present disclosure generally relates to the electronic technology field and, more particularly, to a WiFi network access method, a communication method, a peripheral apparatus, and a storage medium.

BACKGROUND

As a peripheral apparatus, a network of a printer needs to be configured through a control terminal such as a personal computer (PC) or a cell phone. Thus, the printer can be connected to a wireless network. In the existing technology, a commonly used network configuration method includes controlling the terminal to scan the printer using Bluetooth. A user may select a target printer in a printer list that is generated by scanning the printer to perform network configuration. When a plurality of printers exist in the printer list, the user cannot quickly select the printer that needs the network configuration. Thus, a false selection may occur, which causes poor user experience.

SUMMARY

Embodiments of the present application provide a WiFi network access method. The method is applied to a peripheral apparatus. The peripheral apparatus includes a first Bluetooth module and a WiFi module. The method includes, in response to the peripheral apparatus entering a network configuration state, entering a first broadcast state through the first Bluetooth module, sending a first type broadcast packet to a control terminal through the first Bluetooth module, establishing a Bluetooth connection between the peripheral apparatus and the control terminal, receiving router network configuration information from the control terminal through the first Bluetooth module, and connecting the WiFi module into a WiFi network according to the router network configuration information. The first type broadcast packet includes service UUID, identification information of the peripheral apparatus, and a device ID. The identification information of the peripheral apparatus allows a user to first select the peripheral apparatus in a display interface of the control terminal for network configuration.

Embodiments of the present disclosure provide a communication method. The method is applied to a peripheral apparatus. The peripheral apparatus includes a first Bluetooth module. The first Bluetooth module has a function of cyclically broadcasting a broadcast packet with different protocols. The method includes cyclically performing steps of sending a first broadcast packet packaged according to a first Bluetooth protocol to a control terminal through a first Bluetooth module and sending a second broadcast packet packaged according to a second Bluetooth protocol to the control terminal through the first Bluetooth module. The first Bluetooth protocol and the second Bluetooth protocol are different.

Embodiments of the present disclosure provide a WiFi network access method. The method is applied to a control terminal. The control terminal includes a second Bluetooth module. The method includes obtaining an identification information of a peripheral apparatus through a second Bluetooth module. Obtaining an identification information of a peripheral apparatus through a second Bluetooth module includes controlling the control terminal to enter a scanning state to obtain a first type broadcast packet sent by the peripheral apparatus, parsing the first type broadcast packet to obtain the identification information, displaying the device ID of the peripheral apparatus at the first position of the device list of the display interface according to the identification information, and establishing the Bluetooth connection with the peripheral apparatus according to a user selection to send the router network configuration information to the peripheral apparatus. The first type broadcast packet includes service UUID, the identification information of the peripheral apparatus, and a device ID. The identification information of the peripheral apparatus allows a user to first select the peripheral apparatus in a display interface of the control terminal for network configuration.

Embodiments of the present disclosure provide a communication method. The method is applied to a control terminal. The control terminal includes a second Bluetooth module. The method includes obtaining a first broadcast packet packaged according to a first Bluetooth protocol by a peripheral apparatus, and in response to the first Bluetooth protocol being supported by a first APP of the control terminal, parsing the first broadcast packet using the first APP, and/or obtaining the second broadcast packet packaged according to a second Bluetooth protocol by the peripheral apparatus, and in response to the second Bluetooth protocol being supported by a second APP of the control terminal, parsing the second broadcast packet using the second APP.

The technical solutions of embodiments of the present disclosure have the following technical effects.

1. The user can press the button to start and change the Bluetooth broadcast state of the peripheral apparatus.

2. The first broadcast state of the peripheral apparatus can be displayed by the control terminal first. Thus, the user can quickly configure the wireless network for the peripheral apparatus.

3. The peripheral apparatus can support a plurality of Bluetooth protocols, which can improve the compatibility of the peripheral apparatus.

BRIEF DESCRIPTION OF THE DRAWINGS

FIG. 6 is a schematic flowchart showing a method for adding a peripheral apparatus according to some embodiments of the present disclosure.

DETAILED DESCRIPTION OF THE EMBODIMENTS

In order to better understand the technical solutions of the present disclosure, embodiments of the present disclosure are described in detail below in connection with the accompanying drawings.

Described embodiments are only some embodiments of the present disclosure, but not all embodiments. Based on embodiments in the present disclosure, all other embodiments obtained by those of ordinary skill in the art without creative effort are within the scope of the present disclosure.

The terms used in embodiments of the present disclosure are only for the purpose of describing specific embodiments and are not intended to limit the present disclosure. The singular forms "a," "the," and "this" used in embodiments of the present disclosure and the appended claims are intended to include the plural forms as well unless the context clearly specifies otherwise.

The term "and/or" used in the specification is only an association relationship to describe a related object and indicates three kinds of relationships. For example, A and/or B may represent the three relationships of A alone, A and B at the same time, and B alone. In addition, the character "/" in the specification may generally indicate that the related objects in front and back are in a "or" relationship.

The peripheral apparatus of embodiments of the present disclosure may include an image-forming device or a peripheral apparatus having another function, which is not limited by embodiments of the present disclosure. The image-forming device may include a device having at least one function related to image forming. The function related to image forming may include but is not limited to, a printing function, a scanning function, a copying function, and a fax function. For example, the image-forming device may include a single-function printer, a multifunction printer, and a digital composition machine.

The single-function printer may be an image-forming device only having a printing function.

The multifunction printer may be an image-forming device with a printing function, a copying function, a scanning function, and/or a fax function. In the multifunction printer, a number of paper trays may be also set.

The digital composition machine may include a copying function as a base function with standard or optional printing, scanning, and fax functions. Document output may be performed using a digital principle in a laser printing manner. An edition operation may be performed on an image or text. The digital composition machine may include a paper tray with a relatively large capacity. The digital composition machine may include a large memory, a large hard drive, strong network support, and a multitasking parallel processing capability.

A scene to which a WiFi network access method and a communication method of embodiments of the present disclosure are applicable are described below with examples.

Figure 1:
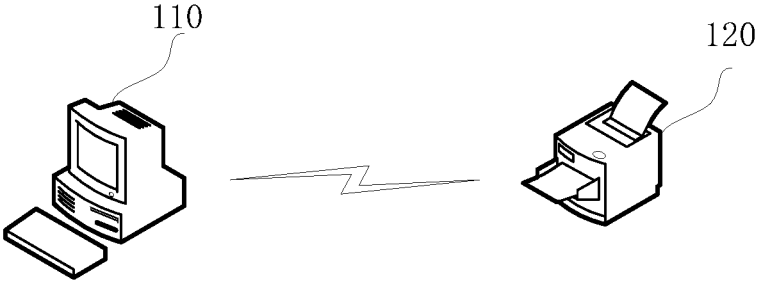
FIG. 1 is a schematic diagram of an application scene according to some embodiments of the present disclosure.

FIG. 1 is a schematic diagram of an application scene according to some embodiments of the present disclosure. As shown in FIG. 1, the application scene includes a control terminal 110 and an image-forming device 120. Data communication exists between the control terminal 110 and the image-forming device 120. The image-forming device 120 may include but is not limited to the single-function printer, the multifunction printer, and the digital composition machine.

The control terminal 110 may be an electronic device installed with a printer driver, e.g., a computer or an electronic device that can be configured to communicate with the image-forming device 120 such as a cell phone or a mobile tablet and may also be referred to as a user terminal, a client terminal, or a host.

A connection manner between the control terminal 110 and the image-forming device 120 may not be limited by embodiments of the present disclosure. In some embodiments, the control terminal 110 may be connected to the image-forming device 120 via a local area network (LAN). In some other embodiments, the image-forming device 120 may be connected to the control terminal 110 through a USB cable. In some other embodiments, the image-forming device 120 may be connected to the control terminal 110 in a wireless manner, such as Bluetooth or Wi-Fi Direct.

In embodiments of the present disclosure, the control terminal 110 may send a printing job to the image-forming device 120 to perform printing output.

Figure 2:
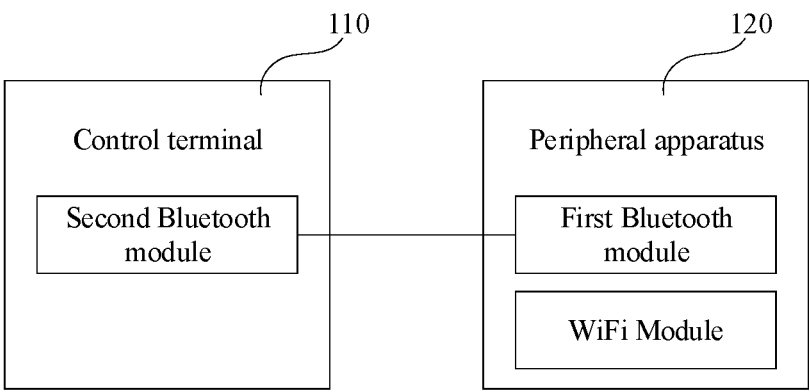
FIG. 2 is a schematic diagram of another application scene according to some embodiments of the present disclosure.

FIG. 2 is a schematic diagram of another application scene according to some embodiments of the present disclosure. As shown in FIG. 2, in embodiments of the present disclosure, the peripheral apparatus 120 includes a first Bluetooth module and a WiFi module. The peripheral apparatus 120 may establish communication with a router through the WiFi module. That is, the peripheral apparatus 120 may need to support both WiFi and Bluetooth. The control terminal 110 includes a second Bluetooth module. The control terminal 110 may establish a Bluetooth connection with the first Bluetooth module of the peripheral apparatus 120 through the second Bluetooth module to implement the Bluetooth communication. The first Bluetooth module and the second Bluetooth module may be Bluetooth low energy (BLE) modules or standard Bluetooth modules. Those skilled in the art may perform a suitable modification on data transmission and reception between the peripheral apparatus 120 and the control terminal 110 and information processing of the peripheral apparatus 120 and the control terminal 110 according to a difference between the BLE technology and the standard Bluetooth technology. Such the modification should be within the scope of the present disclosure.

Embodiments of the present disclosure may provide a WiFi network access method, which enables the user to quickly configure the network of the peripheral apparatus, such as a printer. Thus, the printer can quickly be connected to the wireless network. The method may be described in detail in connection with the accompanying drawings.

Figure 3:
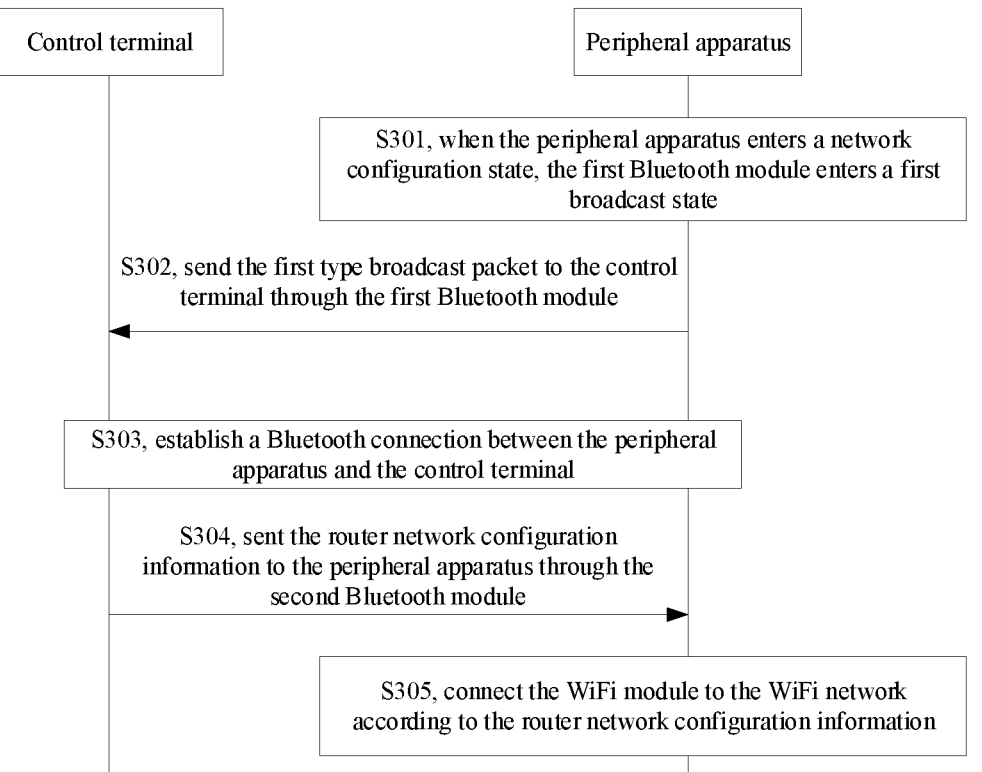
FIG. 3 is a schematic flowchart of a WiFi network access method according to some embodiments of the present disclosure.

FIG. 3 is a schematic flowchart of a WiFi network access method according to some embodiments of the present disclosure. The method can be applied to the application scenes shown in FIG. 1 and FIG. 2. As shown in FIG. 3, the method includes the following processes.

At S301, when the peripheral apparatus enters a network configuration state, the first Bluetooth module enters a first broadcast state.

In some embodiments, the user may start the network configuration operation in the peripheral apparatus. The first Bluetooth module may be switched from a second broadcast state to the first broadcast state. A second type broadcast packet sent by the first Bluetooth module in the second broadcast state may be different from a first type broadcast packet. In some embodiments, the user can start the peripheral apparatus to enter the network configuration state through a panel button of the peripheral apparatus. The first Bluetooth module may be switched from the second broadcast state to the first broadcast state.

In some embodiments, when the peripheral apparatus is turned on the first time after leaving the factory, the first Bluetooth module may be turned on to enter the first broadcast state, which allows the user to quickly configure the wireless network for the peripheral apparatus. After the peripheral apparatus is configured to be connected to the wireless network, the first Bluetooth module may be switched to the second broadcast state, which can be used for interaction of other messages. When the user needs to reconfigure the wireless network for the peripheral apparatus, the broadcast state of the first Bluetooth module may be started or switched to enter the first broadcast state through a push button.

In some embodiments, if the first Bluetooth model of the peripheral apparatus is in an operation state before the user presses the push button to cause the peripheral device to enter the network configuration state, the peripheral apparatus may enter the second broadcast state, the second type broadcast packet may be sent. The second type broadcast packet may not include recognition information. When the peripheral apparatus is in the second broadcast state, the control terminal may detect the peripheral apparatus and establish the Bluetooth connection to perform information interaction. In some embodiments, when the peripheral apparatus is in the second broadcast state, only the Bluetooth connection may be established for information interaction, and the information interaction of the network configuration may not be realized.

In some embodiments, when the WiFi module of the peripheral apparatus is turned on and connected to the router, the first Bluetooth module may be in the second broadcast state. When the WiFi module of the peripheral apparatus is turned on and is not connected to the router, the first Bluetooth module may be set to automatically enter the first broadcast state or to be started to enter the first broadcast state through a user key.

In some embodiments, in the peripheral apparatus, an individual key may be arranged to start the first Bluetooth module to enter the first broadcast state, or an existing key in the peripheral apparatus may be reused to start the first Bluetooth module to enter the first broadcast state, which is not limited by embodiments of the present disclosure.

At S302, the first type broadcast packet is sent to the control terminal through the first Bluetooth module.

In some embodiments, in the first broadcast state, the first Bluetooth module of the peripheral apparatus may broadcast the first type broadcast packet to the outside. The control terminal may enter a scanning state to obtain the first type broadcast packet through the second Bluetooth module. The first type broadcast packet may include service UUID, identification information of the peripheral apparatus, and a device ID. Service UUID can be used to identify whether the corresponding peripheral apparatus satisfies a communication protocol agreed between the control terminal and the peripheral apparatus. A plurality of BLE devices that broadcast the broadcast packets of the plurality of BLE devices may exist around a same control terminal. Thus, only the BLE device, which conforms to the agreed communication protocol may be displayed in the device list of the control terminal APP. A BLE device that does not conform to the agreed communication protocol may not be displayed. With the identification information of the peripheral apparatus, the control terminal may display the device ID of the peripheral apparatus first. Thus, the user can select the peripheral apparatus to perform a quick configuration on the peripheral apparatus to connect the peripheral apparatus to the wireless network.

In some embodiments, with the identification information of the peripheral apparatus, displaying the device ID of the peripheral apparatus first by the control terminal includes receiving the first type broadcast packet by the control terminal and displaying the device ID of the peripheral apparatus at a first position of the device list on a display interface according to the identification information of the peripheral apparatus.

In some embodiments, when the peripheral apparatus enters the first broadcast state, the broadcast data may be as follows.

| Broadcast Segment | Value |
| --- | --- |
| Service UUID | Including FFD1 |
| Manufacture Data | Manufacturer ID ("PT"string, 2 byte) + , Model no. ("M6700DW"string, 7byte) + Reserved segment (00, 13byte) +identify (uchar, 1byte) |

Identify may be used to set a position to 1 after a predetermined key is clicked, which may last for 30s. After the control terminal recognizes the position, the peripheral apparatus may be first displayed in a search list.

At S303, a Bluetooth connection is established between the peripheral apparatus and the control terminal.

In embodiments of the present disclosure, with the identification information of the peripheral apparatus in the first type broadcast packet, the device ID of the peripheral apparatus may be displayed at the first position of the device list on the display interface of the terminal device. Thus, the user may trigger the Bluetooth connection between the peripheral apparatus and the control terminal by clicking the device ID of the peripheral apparatus. In some embodiments, the Bluetooth connection may be the connection between the first Bluetooth module of the peripheral apparatus and the second Bluetooth module of the terminal device.

At S304, the router network configuration information is sent to the peripheral apparatus through the second Bluetooth module.

In some embodiments, after the Bluetooth connection is established between the peripheral apparatus and the control terminal, the network configuration operation can be performed next.

In some embodiments, the network configuration operation may include selecting SSID of the router that needs to be connected at the control terminal by the user and entering a password. After the password is confirmed, the network configuration information may be sent to the peripheral apparatus through Bluetooth. Thus, the WiFi module of the peripheral apparatus may be connected to the wireless network.

Before the peripheral apparatus enters a formal network configuration process, a Service may need to be started first. The Service may include the two features below.

| First feature: ssid_info | |
| --- | --- |
| Content | Description |
| Feature name | ssid_info |
| UUID | Need to include "1C01" |
| Authority | write (with response) |
| Description | Used to receive wifi information |

A corresponding data structure is shown in the following code. typedef struct_SSID_Info {
  unsigned short length;//total length 2 byte
  unsigned char ssidLength;//wireless name length 1 byte
  unsigned char passwordLength;//password length 1 byte
  unsigned char ssid [ ];//Wireless name, UTF8 encoding variable length
  unsigned char password [ ];//Wireless password, UTF8 encoding variable length} SSID_Info;

If the structure is greater than 20 bytes, the data structure may be sent in packets with a maximum of 20 bytes per packet. In order to ensure that the packet is sent correctly. This feature may need to have write (with response) authority.

| Second feature: device_state | |
| --- | --- |
| Content | Description |
| Feature name | device_state |
| UUID | Need to include "1C02" |
| Authority | notify |
| Description | Inform management terminal with network connection progress |

The corresponding data structure may be as follows. notifyState (1 byte, see an example below for value definition)+msg (optional, utf8 string) enum State_Notify {
  IlinkState_Unknown=0,
  IlinkState_SSID_Received=1,//Receive the network configuration information
  Ilink State Linking=2,//during the network configuration
  IlinkState_LinkSuccess=3,//one of success, failed, and wifiErr must have been notified
  IlinkState_LinkWiFiErr=4,//Failure caused by Wifi that is unable to be connected}.

At S305, the WiFi module may be connected to the WiFi network according to the router network configuration information.

In some embodiments, when the network configuration is successful, the peripheral apparatus may notify ILink_LinkSuccess to indicate that the network configuration is successful. In order to improve the user experience, if the peripheral apparatus can determine that the WiFi cannot be connected, ILink_LinkWiFiErr may be notified. Thus, the control terminal may prompt the user to modify the router information.

To facilitate understanding, a WiFi network access method of embodiments of the present disclosure may be described in detail below with reference to a specific application scene.

Figure 4:
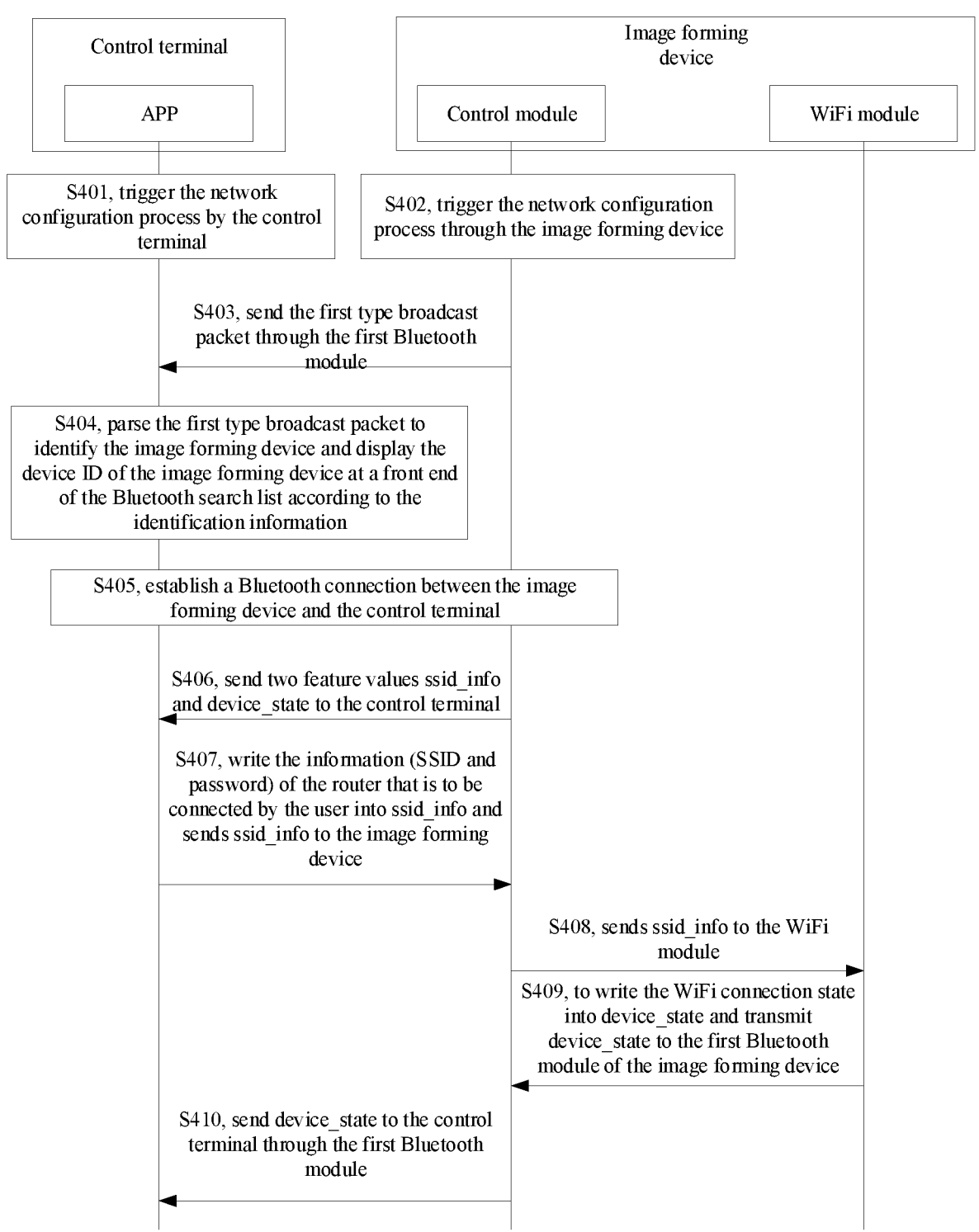
FIG. 4 is a schematic flowchart of a WiFi network access method according to some embodiments of the present disclosure.

FIG. 4 is a schematic flowchart of the WiFi network access method according to some embodiments of the present disclosure. In embodiments of the present disclosure, the peripheral apparatus may be an image-forming device. The image-forming device may include the control module (the first Bluetooth module arranged on the control module) and the WiFi module. An APP may be installed on the control terminal. The control terminal can communicate with the image-forming device using the APP. As shown in FIG. 4, the method includes the following processes.

At S401, the user triggers the network configuration process by the control terminal.

In some embodiments, the user can trigger the network configuration process through the APP of the control terminal, and discover the image-forming device with the network to be configured through Bluetooth.

At S402, the user triggers the network configuration process through the image-forming device.

Process S401 and process S402 may not be represented in order.

At S403, the image-forming device is configured to send the first type broadcast packet through the first Bluetooth module.

In some embodiments, the first type broadcast packet may include the service UUID, the identification information of the printer, and the device ID.

At S404, the control terminal is configured to parse the first type broadcast packet to identify the image-forming device and display the device ID of the image-forming device at a front end of the Bluetooth search list according to the identification information.

At S405, a Bluetooth connection between the image-forming device and the control terminal is established.

Since the device ID of the image-forming device is displayed at the front end of the Bluetooth search list, the user may first select the image-forming device. The control terminal may establish a Bluetooth connection with the image-forming device.

At S406, the image-forming device is configured to send two feature values ssid_info and device_state to the control terminal.

After the image-forming device establishes a Bluetooth connection with the control terminal, the image-forming device may return two feature values of ssid_info and device_state to the control terminal. In some embodiments, the two feature values of ssid_info and device_state may be returned to the APP of the control terminal.

At S407, the control terminal writes the information (SSID and password) of the router that is to be connected by the user into ssid_info and sends ssid_info to the image-forming device.

In some embodiments, the control terminal may send ssid_info to the first Bluetooth module of the image-forming device through the second Bluetooth module.

At S408, the image-forming device sends ssid_info to the WiFi module.

In some embodiments, the first Bluetooth module of the image-forming device may send ssid_info to the WiFi module. Thus, the WiFi module may obtain the SSID and password according to ssid_info to be connect to the router.

At S409, the WiFi module is configured to write the WiFi connection state into device_state and transmit device_state to the first Bluetooth module of the image-forming device.

At S410, the image-forming device is configured to send device_state to the control terminal through the first Bluetooth module.

device_state may be used to notify the control terminal of the state and result of the network configuration. For example, the network configuration is successful or fails.

In some embodiments, when SSID and password of the router that the user chooses to connect to exceeds predetermined bytes, in process S407, the information of the router may need to be sent in packets. The APP may be used to perform packet processing on SSID and password of the router and combine a total number of packets and a cyclic redundancy check (CRC) value of each packet into the first type data packet. After the image-forming device receives the first type data packet, the data of the first type data packet may be saved. The subsequent second type data packet may be distinguished according to the CRC check value of the first type data packet. The data carried by the second type data packet may be combined to restore the information of the router. In some embodiments, if SSID and password are divided into 10 data packets and sent, the first type data packet may include the total number of data packets, 10, and 10 CRC check values. When the second type data packet is received, the image-forming device may be configured to perform checking according to the CRC value carried by the second type data packet and the stored CRC value of the first type data packet. If packet is determined to be correct, the packet may be saved. The second type data packet that is checked to be correct may be parsed to obtain SSID and password of the router.

Figure 5:
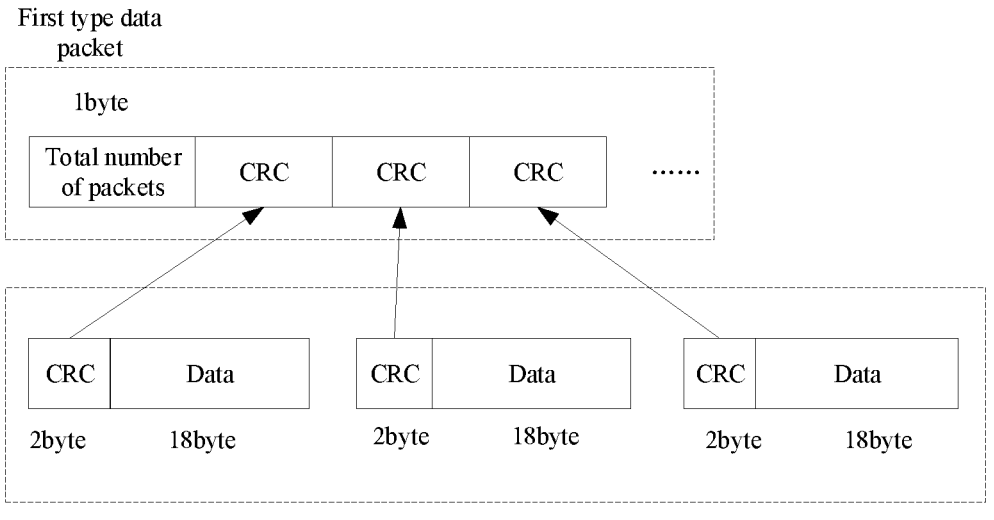
FIG. 5 is a schematic diagram of a type data packet division according to some embodiments of the present disclosure.

FIG. 5 is a schematic diagram of a type data packet division according to some embodiments of the present disclosure. As shown in FIG. 5, in the first type data packet, a total number of packets is 1 byte. In the second type data packet, the CRC value is 2 bytes, and the data is 18 bytes. Those skilled in the art can adopt another data packet division method as needed. For example, the total packet number, the CRC value, and/or the data may be set to other byte numbers, which are not limited by embodiments of the present disclosure.

In the packet division method, the super long information of the router can be divided into packets and sent. The data packets may be ensured to be transmitted safely.

With the technical solutions of embodiments of the present disclosure, following technical effects may be included.

1. The user can press the button to start and change the Bluetooth broadcast state of the peripheral apparatus.

2. The first broadcast state of the peripheral apparatus can be displayed first by the control terminal. Thus, the user can quickly configure the wireless network of the peripheral apparatus. The WiFi network access method is described above. Based on the WiFi network access method, the present disclosure further provides a method for adding the peripheral apparatus to the control terminal after the peripheral apparatus is connected to the WiFi network.

FIG. 6 is a schematic flowchart showing a method for adding a peripheral according to some embodiments of the present disclosure. As shown in FIG. 6, the method includes the following processes.

At S601, the user clicks on the control terminal to add a device.

In some embodiments, the user may click on the APP of the control terminal to add the device. Adding the device may include adding the peripheral apparatus.

At S602, the control terminal performs a search to display a list of devices that are searched (i.e., device list).

In some embodiments, the device list may include a Bluetooth-enabled device list and/or a networked device list.

At S603, when the user selects the peripheral apparatus supporting Bluetooth, a Bluetooth connection is established with the peripheral apparatus supporting Bluetooth, the router information is sent to the peripheral apparatus. After the peripheral apparatus supporting Bluetooth is connected to the network, the control terminal identifies the peripheral apparatus on the network to establish a binding relationship.

In some embodiments, when the user needs to establish a Bluetooth connection with the peripheral apparatus, and the user presses the predetermined button on the peripheral apparatus, the device name of the peripheral apparatus whose predetermined button is pressed may be displayed at the front end in the device list. Thus, the user can quickly select the peripheral apparatus that needs Bluetooth network configuration to quickly configure the network for the peripheral apparatus. The wireless network connection may be established with the peripheral apparatus after the network configuration to add the peripheral apparatus.

When the user presses the predetermined button on the peripheral apparatus, the device name of the peripheral apparatus whose predetermined button is pressed may be displayed at the front end in the device list, which is the same as described above. When the peripheral apparatus supporting Bluetooth initiates Bluetooth broadcasting, the control terminal may receive the first type broadcast packet or the second type broadcast packet. The control terminal may be configured to display the peripheral apparatus that sends the first type broadcast packet at the front end of the device list. Thus, the user can quickly identify the peripheral apparatus that needs to be configured with the network to quickly bound the peripheral apparatus configured with the network.

At S604, when the user selects the peripheral apparatus that is connected to the network, a binding request is initiated with the peripheral apparatus, and a binding relationship is established.

In some embodiments, the list of the device that is connected to the network may include the peripheral apparatus that is configured with the wireless network, or the peripheral apparatus that has been connected to the network in a wired manner, or the peripheral apparatus that establishes communication with a cloud server. When the control terminal searches for the device that is connected to the network, all the peripheral apparatuses that are connected to a same local area network (LAN) may be searched in the LAN where the control terminal is connected to. Further, the control terminal can be configured to search the cloud server for an online peripheral apparatus that establishes the communication with the cloud server through a cellular network or a wide area network and display the searched peripheral apparatus in the list of the device that is connected to the network. When the user selects the peripheral apparatus that is connected to the network, the control terminal can be quickly bounded to the peripheral apparatus.

In embodiments of the present disclosure, the user can use the Wi-Fi network of a cell phone to quickly search for the peripheral apparatus (such as image-forming device) connected to the same Wi-Fi network in the control terminal (such as the cell phone). When). When a mobile). When the cell phone uses the mobile cellular phone in the mobile phone.network, the user may search the peripheral apparatus with cloud communication. Thus, the user can add different peripheral apparatuses to realize a wide range of mobile printing communication.

In some embodiments, the displayed device list may further include the peripheral apparatus that sends SSID. When the user selects the peripheral apparatus that sends SSID, the user may establish direct communication with the peripheral apparatus. The control terminal may be configured to transmit the router information to the peripheral apparatus that sends SSID. Thus, the peripheral apparatus that sends SSID may be connected to the wireless network. Then, the control terminal may establish the communication with the peripheral apparatus in the wireless network and perform the binding operation.

In some embodiments, establishing the direct communication between the control terminal and the peripheral apparatus may include establishing the direct communication between the control terminal with the APP of the peripheral apparatus or establishing a point-to-point connection with the peripheral apparatus through Wi-Fi Direct.

With the technical solutions of embodiments of the present disclosure, when the user initiates device binding or device adding in the control terminal, the control terminal may display the searched peripheral apparatus. A list of the peripheral apparatus supporting Bluetooth and/or a list of the peripheral apparatus supporting WiFi or network may be displayed separately. Thus, the user can quickly identify a desired target device, rather than a device list that displays all the searched peripheral apparatuses, which causes a selection difficulty for the user. In the existing technology, the first Bluetooth module of the peripheral apparatus may send a broadcast packet with a same protocol. The control terminal may be configured to parse the broadcast packet according to the Bluetooth protocol to obtain corresponding data. However, if Bluetooth protocols supported by the peripheral apparatus and the control terminal are different, the peripheral apparatus and the control terminal cannot perform Bluetooth communication.

For the problem, embodiments of the present disclosure may provide a communication method.

Figure 7:
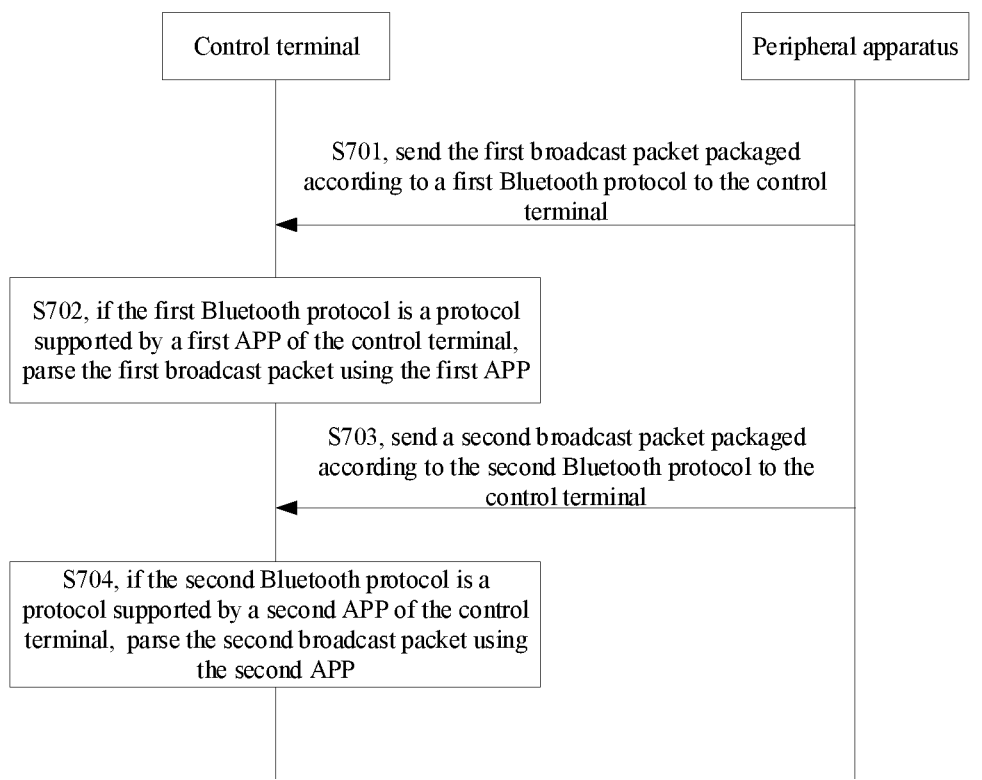
FIG. 7 is a schematic diagram of a communication method according to some embodiments of the present disclosure.

FIG. 7 is a schematic diagram of the communication method according to some embodiments of the present disclosure. The method can be applied to the application scenes shown in FIG. 1 and FIG. 2. As shown in FIG. 7, the method includes the following processes.

At S701, the peripheral apparatus sends the first broadcast packet packaged according to a first Bluetooth protocol to the control terminal.

In embodiments of the present disclosure, the peripheral apparatus may support a plurality of Bluetooth protocols, e.g., the first Bluetooth protocol and a second Bluetooth protocol. In embodiments of the present disclosure, the first Bluetooth protocol and the second Bluetooth protocol are described as examples, which are not limited by embodiments of the present disclosure. For example, in some embodiments, the peripheral apparatus may also support more than three Bluetooth protocols.

First, the peripheral apparatus may package the first broadcast packet according to the first Bluetooth protocol. Then, the first Bluetooth module may enable Bluetooth broadcasting and sends the first broadcast packet to the control terminal.

At S702, if the first Bluetooth protocol is a protocol supported by a first APP of the control terminal, the first broadcast packet is parsed using the first APP.

The control terminal may or may not support the first Bluetooth protocol.

If the first Bluetooth protocol is the protocol supported by the first APP of the control terminal, the first APP may be used to parse the first broadcast packet. If the first Bluetooth protocol is a protocol that is not supported by the control terminal, the first APP may not be used to parse the first broadcast packet, and the first broadcast packet may be discarded.

At S703, the peripheral apparatus sends a second broadcast packet packaged according to the second Bluetooth protocol to the control terminal.

First, the peripheral apparatus can package the second broadcast packet according to the second Bluetooth protocol. Then, the first Bluetooth module may enable the Bluetooth broadcasting and send the second broadcast packet to the control terminal.

In some embodiments, after the peripheral apparatus sends the first broadcast packet, the peripheral apparatus may send the second broadcast packet after delaying a predetermined time, for example, 500 ms, 800 ms, etc., which is not limited by embodiments of the present disclosure.

At S704, if the second Bluetooth protocol is a protocol supported by a second APP of the control terminal, the second broadcast packet is parsed using the second APP.

The control terminal may or may not support the second Bluetooth protocol.

If the second Bluetooth protocol is the protocol supported by the second APP of the control terminal, the second APP may be used to parse the second broadcast packet. If the second Bluetooth protocol is a protocol that is not supported by the control terminal, the second APP may not be used to parse the second broadcast packet, and the second broadcast packet may be discarded.

In summary, in embodiments of the present disclosure, the peripheral apparatus may support the plurality of Bluetooth protocols, which can improve the compatibility of the peripheral apparatus.

In some embodiments, the first broadcast packet and/or the second broadcast packet may include the first type broadcast packet and the second type broadcast packet. The first type broadcast packet may be only sent when the network is configured. The second type broadcast packet may be sent when the network is not configured to perform a normal Bluetooth communication. For the specific contents of the first type broadcast packet and the second type broadcast packet, references may be made to the above description, which are not repeated here.

In some embodiments, the user may start the network configuration operation in the peripheral apparatus. The first Bluetooth module may be switched from the second broadcast state to the first broadcast state. In the first broadcast state, the first Bluetooth module may be configured to broadcast the first type broadcast packet packaged according to the first Bluetooth protocol to the control terminal. In the second broadcast state, the first Bluetooth module may be configured to broadcast the second type broadcast packet packaged according to the first Bluetooth protocol to the control terminal. The first type of broadcast packet may be different from the second type broadcast packet. If the first Bluetooth protocol is the protocol supported by the first APP of the control terminal, the control terminal may use the first APP to parse the first type broadcast packet and the second type broadcast packet.

In some embodiments, the first broadcast packet and/or the second broadcast packet may include service UUID, identification information of the peripheral apparatus, and the device ID. Service UUID can be used to identify whether the corresponding peripheral apparatus conforms to the communication protocol agreed between the control terminal and the peripheral apparatus. A plurality of BLE devices that broadcast the broadcast packets of the plurality of BLE devices may exist around the same control terminal. Thus, only the BLE device, which conforms to the agreed communication protocol may be displayed in the device list of the control terminal APP. The BLE device that does not conform to the agreed communication protocol may not be displayed. With the identification information of the peripheral apparatus, the control terminal may display the device ID of the peripheral apparatus first. Thus, the user can select the peripheral apparatus to perform a quick configuration on the peripheral apparatus to connect the peripheral apparatus to the wireless network.

In some embodiments, after the control terminal uses the first APP to parse the first broadcast packet and/or the second APP to parse the second broadcast packet, the Bluetooth connection between the control terminal and the peripheral apparatus can be established according to the data obtained by parsing the first broadcast packet and/or the second broadcast packet.

After the Bluetooth connection is established between the peripheral apparatus and the control terminal, the network configuration operation can be performed next. In some embodiments, the control terminal may send the router network configuration information to the first Bluetooth module of the peripheral apparatus through the second Bluetooth module. The peripheral apparatus may be configured to connect the WiFi module to the WiFi network according to the router network configuration information.

In some embodiments, when the router network configuration information (i.e., SSID and password of the router) exceeds predetermined bytes, the router network configuration information may need to be sent in packets. In some embodiments, the control terminal may be used to perform packet processing on SSID and password of the router and combine the total number of packets and the cyclic redundancy check (CRC) value of each packet into the first type data packet. After the image-forming device receives the first type data packet, the data of the first type data packet may be saved. The subsequent second type data packet may be distinguished according to the CRC check value of the first type data packet. The data carried by the second type data packet may be combined to restore the information of the router. In some embodiments, if SSID and password are divided into 10 data packets and sent, the first type data packet may include the total number of data packets, 10, and 10 CRC check values. When the second type data packet is received, the image-forming device may be configured to perform checking according to the CRC value carried by the second type data packet and the stored CRC value of the first type data packet. If packet is determined to be correct, the packet may be saved. The second type data packet that is checked to be correct may be parsed to obtain SSID and password of the router. For the specific contents of the network configuration operation, references may be made to the description above, which are not repeated here.

Figure 8:
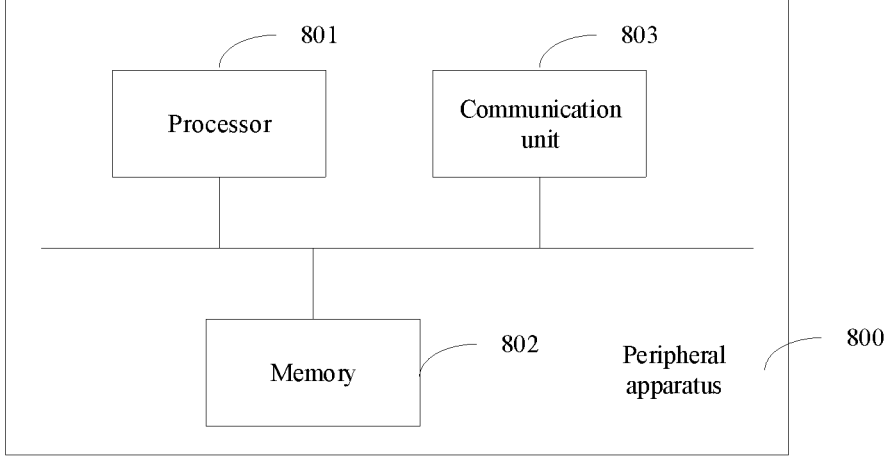
FIG. 8 is a schematic structural diagram of a peripheral apparatus according to some embodiments of the present disclosure.

The present disclosure further provides a peripheral apparatus corresponding to the above embodiments. FIG. 8 is a schematic structural diagram of a peripheral apparatus 800 according to some embodiments of the present disclosure. The peripheral apparatus 800 includes a processor 801, a memory 802, and a communication unit 803, which communicate through one or more buses. Those skilled in the art can understand that a structure of the peripheral apparatus shown in the drawings does not form a limitation on embodiments of the present disclosure. The structure may be a bus-type structure or a star-shaped structure. In some embodiments, the structure may also include more or fewer components than the structure shown in the drawings, or some components may be combined, or the components may be arranged differently.

The communication unit 803 may be configured to establish a communication channel. Thus, the memory 802 can communicate with other devices to receive user data sent by the other devices or send the user data to the other devices.

The processor 801, which is a control center of a storage device, may be configured to run or execute a software program and/or module stored in the memory 802 and call the data in the memory, to execute various functions of the electronic device and/or process the data by using various interfaces and lines to connect various components of the entire electronic device. The processor may be formed by an integrated circuit (IC), for example, by a single packaged IC or a plurality of packaged ICs with a same function or different functions. For example, the processor 801 may include a central processing unit (CPU). In embodiments of the present disclosure, the CPU may include a single computation core or a plurality of computation cores.

The memory 802 may be used to store an execution instruction of the processor 801. The memory 802 may include any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

When the execution instruction of the memory 802 is executed by the processor 801, the peripheral apparatus 800 may be enabled to execute some or all of the processes above.

In some embodiments, the present disclosure also provides a non-transitory computer storage medium. The computer storage medium can store a program and, when the program is executed, causes the processor to perform some or all of the processes of the method of embodiments of the present disclosure. The storage medium may include a magnetic disk, an optical disk, a read-only memory (ROM), a random access memory (RAM), etc.

In embodiments of the present disclosure, "at least one" may indicate one or more, and "a plurality of" may indicate two or more. "And/or", which describes the association relationship of the associated objects, may indicate three kinds of relationships. For example, A and/or B, which can indicate A alone, A and B, and B alone. A and B can be singular or plural. The character "/" may generally indicate that the associated objects have an "or" relationship. "At least one of" and a similar expression may indicate any combination of these items, including any combination of single or plural items. For example, at least one of a, b, or c may represent a, b, c, a-b, a-c, b-c, or a-b-c, where a, b, and c may be single or plural.

Those of ordinary skill in the art can realize that the units and algorithm processes described in embodiments of the present disclosure can be implemented by the electronic hardware and a combination of the computer software and the electronic hardware. Whether these functions are performed in hardware or software depends on the specific application and design constraint of the technical solution. Those skilled in the art may implement the described function by using different methods for each specific application, and these implementations should not be considered beyond the scope of the present disclosure.

Those skilled in the art can clearly understand that, for the specific operation process of the system, device, and unit described above, references may be made to the corresponding process above, which is not repeated here.

In some embodiments of the present disclosure, if any function is implemented in the form of a software functional unit and sold or used as an independent product, the function may be stored in a computer-readable storage medium. Based on such understanding, the essence of the technical solution of the present disclosure, or the part that contributes to the existing technology, or the part of the technical solution may be embodied in the form of a software product. The computer software product may be stored in the storage medium, including some instructions that are used to cause a computer device (e.g., a personal computer, a server, or a network device, etc.) to execute all or part of the processes of the methods of embodiments of the present disclosure. The storage medium may include a U flash drive, mobile hard drive, read-only memory (ROM), random access memory (RAM), magnetic disk, optical disk, or another medium that can store program codes.

The above are only some embodiments of the present disclosure. Those skilled in the art can easily think of changes or replacements within the technical scope of the present disclosure. These changes and replacements should be within the scope of the present disclosure. The scope of the present application shall be subject to the scope of the appended claims.

What is claimed is:

1. A WiFi network access method, applied to a peripheral apparatus, wherein the peripheral apparatus includes a first Bluetooth module and a WiFi module, the method comprising:

in response to the peripheral apparatus entering a network configuration state, entering a first broadcast state through the first Bluetooth module;

sending a first type broadcast packet to a control terminal through the first Bluetooth module, the first type broadcast packet including service UUID, identification information of the peripheral apparatus, and a device ID, wherein the identification information of the peripheral apparatus allows a user to first select the peripheral apparatus in a display interface of the control terminal for network configuration, by:

receiving the first type broadcast packet by the control terminal; and displaying the device ID of the peripheral apparatus at a first position of a device list of the display interface according to the identification information of the peripheral apparatus;

establishing a Bluetooth connection between the peripheral apparatus and the control terminal;

receiving router network configuration information from the control terminal through the first Bluetooth module; and connecting the WiFi module into a WiFi network according to the router network configuration information, wherein in response to the peripheral apparatus entering the network configuration state, causing the first Bluetooth module to enter the first broadcast state includes:

starting a network configuration operation in the peripheral apparatus by a button or when the peripheral apparatus is not connected to a wireless network, the first Bluetooth module being switched from a second broadcast state to the first broadcast state, a second type broadcast packet sent by the first Bluetooth module in the second broadcast state being different from the first type broadcast packet, the second type broadcast packet does not include the identification information of the peripheral apparatus.

2. The method according to claim 1, wherein receiving the router network configuration information from the control terminal through the first Bluetooth module includes:

receiving a first data packet, the first data packet including a total number of packets and a check value of the packets;

receiving a second data packet;

determining whether the second data packet is correct according to the check value of the first data packet; and in response to the second data packet being correct, parsing the second data packet to obtain the router network configuration information.

3. The method according to claim 1, further including:

receiving, by the control terminal, a first broadcast packet packaged according to a first Bluetooth protocol from the peripheral apparatus through the first Bluetooth module, receiving a second broadcast packet packaged according to a second Bluetooth protocol from the peripheral apparatus through the first Bluetooth module, the first Bluetooth protocol and the second Bluetooth protocol being different.

4. The method according to claim 3, wherein the first broadcast packet and/or the second broadcast packet include the first type broadcast packet and the second type broadcast packet.

5. The method according to claim 3, wherein:

the first Bluetooth protocol is supported by a first application (APP) of the control terminal, and the control terminal is configured to parse the first broadcast packet using the first APP; and/or the second Bluetooth protocol is supported by a second APP of the control terminal, and the control terminal is configured to parse the second broadcast packet using the second APP.

6. The method according to claim 1, prior to entering the first broadcast state through the first Bluetooth module, the method further comprising:

receiving that the user has pressed a predetermined button on the peripheral apparatus.

7. A WiFi network access method, applied to a control terminal, wherein the control terminal including a second Bluetooth module, the method comprising:

in response to a peripheral apparatus entering a network configuration state and a first Bluetooth module of the peripheral apparatus entering a first broadcast state, obtaining an identification information of the peripheral apparatus through a second Bluetooth module, including:

controlling the control terminal to enter a scanning state to obtain a first type broadcast packet sent by the peripheral apparatus, the first type broadcast packet including service UUID, the identification information of the peripheral apparatus, and a device ID, wherein the identification information of the peripheral apparatus allows a user to first select the peripheral apparatus in a display interface of the control terminal for network configuration;

parsing the first type broadcast packet to obtain the identification information;

displaying the device ID of the peripheral apparatus at a first position of the device list of the display interface according to the identification information; and establishing the Bluetooth connection with the peripheral apparatus according to a user selection to send the router network configuration information to the peripheral apparatus, wherein in response to a peripheral apparatus entering a network configuration state and a first Bluetooth module of the peripheral apparatus entering a first broadcast state includes:

starting a network configuration operation in the peripheral apparatus by a button or when the peripheral apparatus is not connected to a wireless network, the first Bluetooth module being switched from a second broadcast state to the first broadcast state, a second type broadcast packet sent by the first Bluetooth module in the second broadcast state being different from the first type broadcast packet, the second type broadcast packet does not include the identification information of the peripheral apparatus.

8. The method according to claim 7, further comprising:

receiving a message of successful network connection returned by the peripheral apparatus; and sending a disconnection instruction to the peripheral apparatus to disconnect the Bluetooth connection from the peripheral apparatus.

9. The method according to claim 7, wherein sending the router network configuration information to the peripheral apparatus includes:

sending a first data packet, the first data packet including a total number of packets and a check value of the packets;

sending a second data packet;

determining whether the second data packet is correct according to the check value of the first data packet by the peripheral apparatus; and in response to the second data packet being correct, parsing the second data packet to obtain the router network configuration information.

10. The method according to claim 7, wherein:

the device list of the display interface includes a list of a peripheral apparatus supporting Bluetooth and/or a list of a peripheral apparatus that is connected to a network;

controlling the control terminal to enter the scanning state includes:

controlling the second Bluetooth module of the control terminal to search for the peripheral apparatus supporting Bluetooth, and/or the peripheral apparatus that is connected to the network, and/or a peripheral apparatus communicating with a cloud server; and in response to the user selecting the peripheral apparatus that is connected to the network or the peripheral apparatus that communicates with the cloud server, the control terminal is bounded to the peripheral apparatus that is connected to the network or the peripheral apparatus that communicates with the cloud server.

11. The method according to claim 7, wherein:

the device list of the display interface further includes a peripheral apparatus sending SSID; and in response to the user selecting the peripheral apparatus that sends SSID, a direct communication is established with the peripheral apparatus to send the router network configuration information to the peripheral apparatus.

\* \* \* \* \*